TEMPERATURE COMPENSATED CRYSTAL DEVICE

Filed April 12, 1957

INVENTOR.
Carl M. Lewis
BY
Seegert & Schwalbach
Att'ys

United States Patent Office 2,952,786
Patented Sept. 13, 1960

2,952,786

TEMPERATURE COMPENSATED CRYSTAL DEVICE

Carl M. Lewis, Wauwatosa, Wis., assignor, by mesne assignments, to Minnesota Mining and Manufacturing Company, St. Paul, Minn., a corporation of Delaware Filed Apr. 12, 1957, Ser. No. 652,576

5 Claims. (Cl. 310—8.9)

This invention relates to frequency controlling apparatus and more particularly to apparatus wherein the output frequency is dependent upon temperature conditions.

More specifically, this invention pertains to frequency controlling apparatus which employ piezoelectric crystals. Heretofore, the frequency output of piezoelectric crystals has been quite unstable due to temperature fluctuations of the crystal, or if it was decided that the temperature of the crystal should be controlled, means were employed to heat the crystal to some temperature higher than the ambient temperature. This was often found objectionable particularly when the desired frequency output from a particular crystal required the temperature thereof to be below ambient. This condition has been aggravated by the use of piezoelectric crystals in certain apparatus wherein the ambient temperature conditions during continuous operation are unusually high. High temperatures are particularly objectionable due to the fact that crystal materials tend to sublime more rapidly at elevated temperatures. This sublimation, of course, causes an appreciable reduction in the mass of the crystal and hence further variation in the output frequency thereof. High temperatures also effect softening of the mounting means or bonding agents such as solder. This often causes some dampening of the crystal's motion and hence is objectionable for that reason. My present invention, however eliminates such shortcomings by affording means in combination with piezoelectric crystals in frequency controlling apparatus whereby the temperature of such crystal can be maintained at any desired temperature above, below or at ambient temperature.

It is therefore an object of the present invention to provide apparatus affording a pulsating charge output, the frequency of pulsations of which is substantially constant.

Another object is to provide apparatus as characterized above, comprising a piezoelectric crystal and an electrically energizable heat pump for maintaining the temperature of the crystal substantially constant.

Another object is to provide frequency control apparatus as characterized above comprising means for maintaining the piezoelectric crystal at a substantially constant temperature which is less than ambient temperature.

Another object of this invention is to provide frequency controlling apparatus as characterized above wherein a reversely energizable heat pump having energizing means therefor including a temperature responsive reversing switch is employed to maintain the temperature of the crystal substantially constant at any desired temperature above, below or at ambient temperature.

A further object of this invention is to position the temperature responsive switch means, in the frequency controlling apparatus as characterized above, between the heat pump and the crystal so that said switch anticipates the heat afforded said crystal by said heat pump so as to maintain the temperature of said crystal substantially constant.

Another object is to provide frequency controlling apparatus as characterized above wherein the heat pump comprises at least one semi-metallic thermoelement.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
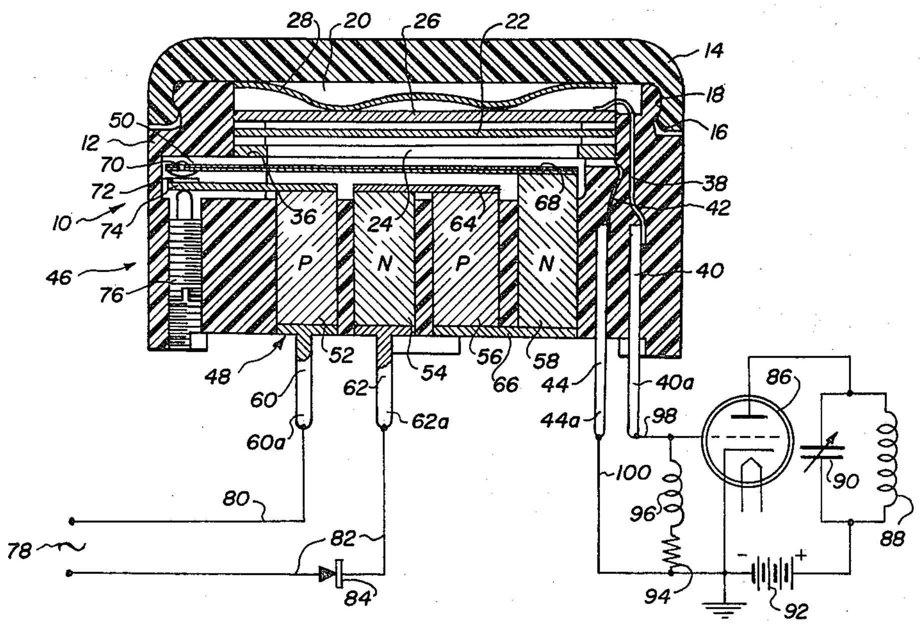
Figure 1 is a sectional view of frequency controlling apparatus embodying temperature controlling means whereby a piezoelectric crystal may be maintained at a constant temperature which is less than ambient temperature; said apparatus being schematically shown in circuit with other electronic components.

Referring to Figure 1 of the drawings, it shows a frequency controlling device 10 in circuit with various electronic components in such a manner as to provide a conventional vacuum tube oscillator. Frequency controlling device 10 comprises a housing or body 12 and a cover member 14 formed of any desired electrical insulating material; said body and cover being formed with complementally shaped surfaces 16 and 18 respectively for retaining the body and cover in assembled relation shown in Figure 1.

Body portion 12 is formed with a hollow interior providing a cavity or opening 20 wherein a piezoelectric crystal 22 is held in a fixed position by means of conventional electrode plates 24 and 26, and a prestressed leaf spring 28. Although any desired means may be employed for mounting crystal 22 within cavity 20 of body 12, I prefer to employ electrode plates 24 and 26 having the particular configuration shown in Figure 2. Electrode plate 24 is made of electrical conducting material and is formed with four side portions 24*a*, 24*b*, 24*c* and 24*d* affording a framelike structure having an open interior, and enlarged or extended corner portions 32*a*, 32*b*, 32*c* and 32*d* which rest against crystal 22 when plate 24 is in assembled position with respect thereto. Electrode plate 26 is likewise made of electrical conducting material and is provided with enlarged or extended corner portions 34*a*, 34*b*, 34*c* and 34*d* for contact with piezoelectric crystal 22 when in assembled position with respect thereto.

Piezoelectric crystal 22 together with electrode plates 24 and 26 are positioned within the cavity 20 of body 12, the marginal edge of the under surface of electrode plate 24 resting on ledges or shoulder means 36 formed in body 12, and the leaf spring 28 being interposed between electrode plate 26 and cover member 14, to retain electrode plates 24 and 26 and crystal 22 in assembled relation. Spring 28 also acts to apply a predetermined pressure to crystal 22 for a purpose to be hereinafter explained.

Circuit connection means comprising a lead wire 38 having one of its ends connected to electrode plate 26 as by welding, soldering or brazing, and a current conductor 40 connected by welding, soldering or brazing to the other end of lead wire 38 and having a prong portion 40*a* positioned in body 12 as shown in Figure 1. In like manner, circuit connction means comprising a lead wire 42 having one of its ends connected to electrode plate 24 as by welding, soldering or brazing and a current conductor 44 having a prong portion 44a electrically connected to the other end of wire 42 is also provided in body 12.

Positioned subjacent the aforedescribed piezoelectric crystal subassembly, is a temperature controlling device 46 comprising electrically energizable heat pump means 48 and temperature responsive circuit controlling means 50 in circuit therewith. Heat pump means 48 comprises thermoelements 52, 54, 56 and 58, of which elements 52 and 56 exhibit positive thermoelectric characteristics and elements 54 and 58 exhibit negative thermoelectric characteristics as denoted by the symbols "P" and "N" respectively. Circuit connectors 60 and 62 are fixed respectively to the lower end portions of thermoelements 52 and 54 and are provided with prong portions 60a and 62a respectively. An electrical conducting member 64 is fixed to the adjacent upper end portions of thermoelements 54 and 56 to afford electrical continuity therebetween. In like manner, an electrical conducting member 66 is fixed to the adjacent lower end portions of thermoelements 56 and 58 to afford electrical continuity therebetween.

Circuit controlling device 50 comprises a bimetallic element 68 formed to dissimilar metals and fixed at one end to the upper end portion of thermoelement 58. Fixed to bimetallic element 68 at the other end thereof, is a movable contact 70 for cooperation with a stationary contact 72 carried by an electrical conducting member 74 fixed to thermoelement 52. As is well understood in the art, heating or cooling of bimetallic element 68 causes deformation thereof and hence circuit controlling actuation of movable contact 70 with respect to stationary contact 72 due to the difference in coefficients of expansion of the metallic elements of which elements 68 is composed. A plug member 76 adjustably threaded within body 12, is provided for changing the relative positions of contacts 70 and 72 for changing the response temperature of device 50, as is well understood in the art. As shown in Figure 1, plug 76 is formed with a screw driver kerf to facilitate such adjustment.

Frequency controlling device 10, due to the provision of prong portions 40a, 44a, 60a and 62a for effecting the necessary electrical connections thereto, may be fixedly positioned on any desired mounting means or chassis having a suitably formed plug or receptacle (not shown) adapted to receive such prong portions. In any event, it is necessary that connection be made from a source of electrical energy, shown at 78 in Figure 1, to conductors 60 and 62, as by means of lead wires 80 and 82. Since heat pump 48 requires direct current energization, I have provided a unidirectional conducting device or rectifier 84 in lead wire 82 for rectification of the current flow from the alternating current source shown at 78. As will be readily apparent to those persons skilled in the art, a direct current energy source may be substituted for the alternating current source shown at 78 in Figure 1, in which event there will be no need for the rectifier 84.

The conventional vacuum tube oscillator in circuit with frequency controlling device 10 comprises a triode vacuum tube 86 having in its plate or anode circuit a tank circuit consisting of inductance coil 88 and an adjustable capacitor 90, an anode-cathode power supply 92, and shunt means consisting of a resistor 94 and a series choke inductor 96 connected between the cathode and control grid of tube 86 to provide a suitable bias voltage. Lead wires 98 and 100 connect piezoelectric crystal 22 across the series circuit comprising resistor 94 and choke inductor 96.

In order for thermoelements 52, 54, 56 and 58 to pump heat so as to lower the temperature within enclosure 20, as will be hereinafter explained in greater detail, it is necessary that such elements be of any suitable material which exhibits a high Peltier coefficient, low thermal conductivity, and low electrical resistivity. More specifically, elements 52, 54, 56 and 58 may be of the material disclosed in the copending application of Robert W. Fritts and Sebastian Karrer, Serial Number 512,436, filed June 6, 1956, now Patent No. 2,896,005. Such materials are semi-metallic alloys or compositions which may be characterized as binary metallic compounds of slightly imperfect compositions, i.e., containing beneficial impurities constituting departures from perfect stoichiometry by reason of an excess of one of the metals over the other and/or containing added beneficial impurity substantances denominated hereinafter "promoters." Such semi-metallic compositions have semiconductor-like conductivity (both electrical and thermal, as aforementioned). Semi-metallic alloys or compositions also include mixtures of such binary metallic compounds, which may be denominated ternary metallic alloys or compositions. Certain of these alloys or compositions exhibit negative and certain exhibit positive electrical characterists.

The type (positive or negative) of alloy or composition selected for thermoelements 52, 54, 56 and 58 is dependent upon the direction of current flow through such elements and the direction in which it is desired to have the heat pumped. That is, current flow through a thermoelement which exhibits positive electrical characteristics causes heat to be pumped in the direction of current flow therethrough. Conversely, current flow through a thermoelement which exhibits negative electrical characteristics causes heat to be pumped in the direction opposite to the direction of current flow therethrough.

The operation of the apparatus shown in Figure 1 is as follows:

The capacitor 90 may be adjusted so that the tank circuit resonates at a frequency which is at or near the frequency of a natural resonance of the crystal 22. Any excitation in the anode-cathode circuit of the triode vacuum tube 86 tends to produce oscillations at the frequency of resonance of the tuned tank circuit. The resulting oscillatory voltage appears across the interelectrode capacitance between the plate and control grid of vacuum tube 86 and the impedance of crystal 22. Such oscillatory voltage is applied regeneratively to the control grid circuit of vacuum tube 86 whereby oscillations are set up in accordance with the impedance-frequency characteristic of crystal 22. However, in order to maintain the frequency of such oscillations substantially constant, it is necessary to maintain piezoelectric crystal 22 at a substantially constant temperature. This is accomplished by the aforedescribed temperature controlling device 46 which comprises heat pump means 48 and the temperature responsive circuit controlling device 50.

With contacts 70 and 72 of circuit controlling device 50 in engagement, current is caused to flow through heat pump means 48, from one side of the source shown at 78 through lead wire 82 including rectifier 84, circuit connector 62, thermoelement 54, conducting member 64, thermoelement 56, conducting member 66, thermoelement 58, bimetallic element 68, contacts 70 and 72, conducting member 74, thermoelement 52, circuit connector 60, and lead wire 80 to the other side of the source shown at 78. As hereinbefore explained, such current flow through negative thermoelements 54 and 58, namely, from connector 62 to member 64 and from member 66 to bimetallic element 68 respectively, causes heat to be pumped in the direction opposite to current flow therethrough wherefore heat is absorbed from within cavity 20 by the upper end portions of elements 54 and 58 and dissipated to the surrounding atmosphere by the lower end portions thereof. In similar fashion, such current flow through positive thermoelements 52 and 56, namely, from conducting member 64 to conducting member 66 and from conducting member 74 to connecting member 60 respectively, causes heat to be absorbed from within cavity 20 by the upper end portions of thermoelements 52 and 56 and dissipated to the surrounding atmosphere by the lower end portions thereof. It is thus seen that the use of both positive and negative thermoelements in the above-described circuit causes all of the thermoelements 52, 54, 56 and 58 to simultaneously remove heat from within cavity 20. In this manner, the temperatures of piezoelectric crystal 22 and bimetallic element 68 are decreased.

Upon a predetermined decrease in the temperature of bimetallic element 68, and hence a predetermined decrease in the temperature of crystal 22, as determined by the position of plug 76, contact 70 is moved to circuit interrupting position with respect to stationary contact 72 by virtue of warping or deformation of bimetallic element 68. In such event, the aforedescribed circuit through heat pump means 48 is interrupted and further decrease in the temperature within cavity 20 is thereby terminated.

As the temperature of crystal 22 increases, as may be effected by a higher ambient temperature, bimetallic element 68 also increases in temperature and hence deforms accordingly until movable contact 70 is moved into engagement with stationary contact 72. Such reengagement of contacts 70 and 72 again completes the aforedescribed energizing circuit for heat pump means 48 to thereby decrease the temperature within cavity 20 of body 12 as aforedescribed. Such energization and deenergization of heat pump means 48 continues to take place in accordance with the temperature sensed by bimetallic element 68, thereby maintaining crystal 22 at a substantially constant temperature which is below ambient temperature.

Another feature of the present invention is the placement of the bimetallic element 68 between crystal 22 and heat pump means 48. Due to such placement, any change in temperature of crystal 22 effected by heat pump means 48 is first realized by bimetallic element 68 by virtue of heat pump means 48 being closer to element 68 than to crystal 22. Thus, in effect, bimetallic element 68 is able to sense the temperature changes effected in crystal 22 by heat pump means 48 before such temperature changes actually take place. Thus, we have an arrangement whereby the temperature responsive means anticipates temperature changes in the crystal so that the range of temperature variations of crystal 22 is appreciably reduced, said crystal 22 thereby being maintained at a substantially constant temperature.

Figures 2, 3:
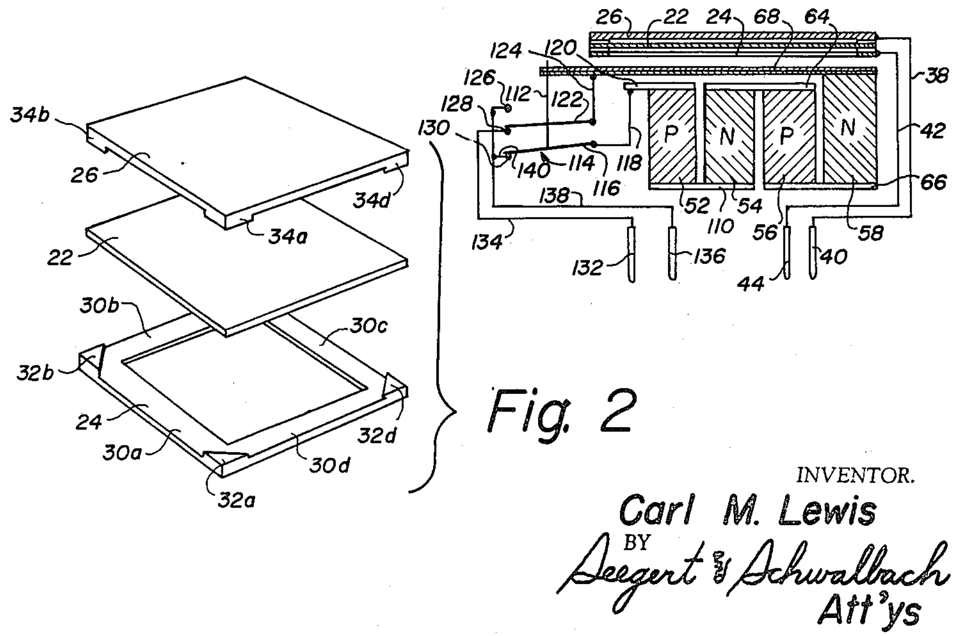
Figure 2 is an exploded perspective view of the mounting means for the piezoelectric crystals employed in the frequency controlling apparatus of Figure 1.
Figure 3 is a sectional view of temperature controlling means for maintaining a piezoelectric crystal at a substantially constant temperature above, below or at ambient temperature.

Should it be desired to maintain crystal 22 at a temperature substantially equal to ambient temperature, the device shown more or less schematically in Figure 3 may be employed. Such device comprises many of the same elements shown in Figure 1 and hereinbefore described. Such elements which are common to both Figure 1 and Figure 3 are identified with the same reference designation and will not now be described in detail, it being realized that reference may be had to the description of Figure 1 for a complete understanding of such elements.

In addition to such common components, the device of Figure 3 employs a conducting member 110 fixed to the lower end portions of thermoelements 52 and 54 to afford electrical continuity therebetween. Fixed to the end of bimetallic element 68, is an actuating stem 112 of a double-pole double-throw reversing switch 114. Switch 114 comprises a first electrical pole member 116 pivotally fixed to actuating stem 112 and connected in circuit with a conducting member 120 fixed to the upper end portion of thermoelement 52 by means of a lead wire 118. A second electrical pole member 122 also pivotally fixed to actuating stem 112 is connected in circuit with bimetallic element 68 by means of a lead wire 124. Switch 114 further comprises three stationary contacts 126, 128 and 130. Stationary contact 126 is connected to a circuit connector 136 by means of a lead wire 138, while stationary contact 128 is connected in circuit with a circuit connector 132 by means of a lead wire 134. A lead wire 140 affords connection of stationary contact 130 with lead wire 138.

The operation of the device of Figure 3 will now be described:

With connecting members 132 and 136 connected to the opposite sides of a source of electrical power while switch 114 is in the position shown, current is caused to flow through the heat pump means from one side of the source through connecting member 136, lead wires 138 and 140, stationary contact 130, pole member 116, lead wire 118, conducting member 120, thermoelement 52, conducting member 110, thermoelement 54, conducting member 64, thermoelement 56, conducting member 66, thermoelement 58, bimetallic elements 68, lead wire 124, pole member 122, stationary contact 128, lead wire 134 and connecting member 132 to the other side of the source. In the manner above explained with reference to the operation of the device of Figure 1, such current flow causes heat to be absorbed by the upper end portions of the thermoelements 52, 54, 56 and 58, and dissipated to the surrounding atmosphere by the lower end portions thereof. Such heat pumping action, of course, causes a decrease in the temperatures of piezoelectric crystal 22 and bimetallic element 68. Upon predetermined decrease in the temperature of crystal 22 and hence bimetallic element 68, the latter is caused to deform sufficiently to cause pole member 122 to be moved out of engagement with stationary contact 128 and into engagement with stationary contact 126, and pole member 116 to be moved out of engagement with stationary contact 130 and into engagement with stationary contact 128. In this manner, the direction of current flow through the heat pump is reversed. That is, current now flows from one side of the aforementioned source of electrical power through connecting member 136, lead wire 138, stationary contact 126, pole member 122, lead wire 124, bimetallic element 68, thermoelement 58, conducting member 66, thermoelement 56, conducting member 64, thermoelement 54, conducting member 110, thermoelement 52, conducting member 120, lead wire 118, pole member 116, stationary contact 128, lead wire 134, and connecting member 132 to the other side of such source. Thus, in accordance with the aforedescribed heat pumping action, each of the lower end portions of the thermoelements 52, 54, 56 and 58 absorbs heat from the surrounding atmosphere, the upper end portions of each of such elements dissipating such heat to the cavity 20 of body 12. In this manner, the piezoelectric crystal 22 and bimetallic element 68 are heated until the temperature of bimetallic element 68 changes sufficiently to cause pole members 116 and 122 of switch 114 to be returned to their original positions. Such return actuation of switch 114 causes the direction of energization of the heat pump to be reversed so as to effect cooling of crystal 22. Such heating and cooling operation takes place whenever it is desired to maintain the temperature of crystal 22 at or near ambient temperature. However, in the event it is desired to maintain the temperature of crystal 22 at any temperature other than ambient, it is seen that switch 114, will merely cycle between circuit interrupting position and one or the other aforedescribed circuit completing positions in accordance with the relationship between the ambient temperature and the temperature to be maintained within cavity 20. It is thus seen that the device of Figure 3 is operable to maintain crystal 22 at any desired substantially constant temperature which is above, below or at ambient temperature.

As above explained with reference to the device of Figure 1, it will be noted that the bimetallic element 68 of Figure 3 is positioned between the heat pump means and the piezoelectric crystal so as to afford anticipation of temperature changes of crystal 22 as effected by the heat pump. In this manner, of course, the range of fluctuation of the temperature of crystal 22 is decreased substantially so that crystal 22 is maintained at a substantially constant temperature.

It is thus seen that the present invention provides frequency controlling apparatus which has many varied applications and which is extremely sensitive and hence extremely accurate in affording a constant frequency.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A unitary temperature compensated crystal device having substantially constant electrical characteristics, comprising a housing having wall portions of insulating material defining a chamber, a crystal having temperature sensitive operating characteristics mounted in said chamber, and means for maintaining the temperature of said crystal at a substantially constant level in spite of fluctuations in the temperature of the environment external to said housing, comprising a thermoelectric heat pump having at least one first thermojunction member exposed within said chamber in heat transfer relation with said crystal and having at least one second thermojunction member exposed externally of said housing, and temperature responsive reversing switch means having a temperature sensing portion within said chamber and contacts connected in circuit with said heat pump and adapted for connection to a source of direct current to permit direct current flow from said source to said heat pump in one direction or in the opposite direction for alternate heating or cooling of said crystal as necessary to maintain the same at a substantially constant temperature.

2. A unitary temperature compensated crystal device having substantially constant electrical operating characteristics, comprising a housing having wall portions of insulating material defining a chamber, a crystal having temperature sensitive electrical operating characteristics mounted in said chamber, and means for maintaining the temperature of said crystal at a substantially constant level in spite of fluctuations in the temperature of the environment external to said housing, comprising a thermoelectric heat pump having at least one first thermojunction member exposed within said chamber in heat transfer relation with said crystal and having at least one second thermojunction member exposed externally of said housing, temperature responsive reversing switch means having a temperature sensing portion within said chamber and contacts connected in circuit with said heat pump and adapted for connection to a source of direct current to permit direct current flow from said source to said heat pump in one direction or in the opposite direction for alternate heating or cooling of said crystal as necessary to maintain the same at a substantially constant temperature, and control point adjustment means accessible externally of said housing for adjusting the temperature control point of said reversing switch means and thereby the temperature at which said crystal is maintained.

3. A unitary substantially constant frequency piezoelectric crystal device, comprising a housing having wall portions of insulating material defining a chamber, a piezoelectric crystal mounted in said chamber, and means for maintaining the frequency of said crystal at a substantially constant level in spite of fluctuations in the temperature of the environment external to said housing, comprising a thermoelectric heat pump having thermoelement means embedded within one of said insulating wall portions, said heat pump also having at least one first thermojunction member exposed within said chamber in heat transfer relation with said crystal and at least one second thermojunction member exposed externally of said housing, and temperature responsive reversing switch means having a temperature sensing portion within said chamber and contacts connected in circuit with said heat pump and adapted for connection to a source of direct current to permit direct current flow from said source to said heat pump in one direction or in the opposite direction for alternate heating or cooling of said crystal as necessary to maintain the same at a substantially constant temperature and thereby the frequency thereof at a substantially constant level.

4. A unitary substantially constant frequency piezoelectric crystal device, comprising a housing having wall portions of insulating material defining a chamber, a piezoelectric crystal mounted in said chamber, and means for maintaining the frequency of said crystal at a predeterminated substantially constant level in spite of fluctuations in the temperature of the environment external to said housing tending to vary the frequency of said crystal both above and below said predetermined level, comprising a thermoelectric heat pump having thermoelement means embedded substantially whole length thereof within one of said insulating wall portions, said thermoelement means having inner end portions electrically joined to at least one thermojunction member exposed within said chamber in heat transfer relation with said crystal and having outer end portions electrically joined to at least one second thermojunction member overlaying outer surface portions of said insulating wall portion, and temperature responsive reversing switch means having a temperature sensing portion within said chamber and contacts connected in circuit with said heat pump and adapted to be connected to a source of direct current to afford reversible energization of said heat pump as necessary to maintain the temperature and hence the frequency of said crystal substantially constant, said heat pump when energized by current of one polarity in response to sensing of a chamber temperature below a predetermined value providing heating of said crystal, and when energized by current of the opposite polarity in response to sensing of a chamber temperature above a predetermined value providing cooling of said crystal.

5. A unitary substantially constant frequency piezoelectric crystal device, comprising a housing having wall portions of insulating material defining a chamber, a piezoelectric crystal mounted in said chamber, and means for maintaining the frequency of said crystal at a predetermined substantially constant level in spite of fluctuations in the temperature of the environment external to said housing tending to vary the frequency of said crystal both above and below said predetermined level, comprising a thermoelectric heat pump having thermoelement means embedded substantially whole length thereof within one of said insulating wall portions, said thermoelement means having inner end portions electrically joined to at least one first thermojunction member exposed within said chamber in heat transfer relation with said crystal and having outer end portions electrically joined to at least one second thermojunction member overlaying outer surface portions of said insulating wall portion, temperature responsive reversing switch means having a temperature sensing portion within said chamber and contacts connected in circuit with said heat pump and adapted to be connected to a source of direct current to afford reversible energization of said heat pump as necessary to maintain the temperature and hence the frequency of said crystal substantially constant, said heat pump when energized by current of one polarity in response to sensing of a chamber temperature below a predetermined value providing heating of said crystal, and when energized by current of the opposite polarity in response to sensing of a chamber temperature above a predetermined value providing cooling of said crystal, and control point adjustment means accessible externally of said housing for adjusting the temperature control point of said switch means and thereby the frequency level at which said crystal is maintained.

References Cited in the file of this patent

UNITED STATES PATENTS

| | | |
|---|---|---|
| 413,136 | Dewey | Oct. 15, 1889 |
| 420,641 | Dewey | Feb. 4, 1890 |
| 484,182 | Dewey | Oct. 11, 1892 |
| 1,120,781 | Altenkirch et al. | Dec. 15, 1914 |
| 1,856,865 | Darrah | May 3, 1932 |
| 1,875,953 | Taylor | Sept. 6, 1932 |
| 1,962,210 | Osnos | June 12, 1934 |
| 2,004,170 | Moser et al. | June 11, 1935 |
| 2,018,321 | Roosenstein | Oct. 22, 1935 |
| 2,301,007 | Baldwin | Nov. 3, 1942 |
| 2,575,100 | Duey | Nov. 13, 1951 |
| 2,676,274 | Kobayashi | Apr. 20, 1954 |
| 2,766,937 | Snavely | Oct. 16, 1956 |
| 2,777,975 | Aigrain | Jan. 15, 1957 |
| 2,791,706 | Font | May 7, 1957 |